United States Patent
Huston et al.

(10) Patent No.: US 9,268,030 B2
(45) Date of Patent: Feb. 23, 2016

(54) LASER-HEATED THERMOLUMINESCENCE DOSIMETER

(71) Applicants: Alan Huston, Aldie, VA (US); Brian L. Justus, Springfield, VA (US)

(72) Inventors: Alan Huston, Aldie, VA (US); Brian L. Justus, Springfield, VA (US); Marko Moscovitch, Bethesda, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 48 days.

(21) Appl. No.: 13/785,330

(22) Filed: Mar. 5, 2013

(65) Prior Publication Data

US 2014/0252230 A1    Sep. 11, 2014

(51) Int. Cl.
*G01T 1/11*    (2006.01)
*G01T 1/115*    (2006.01)

(52) U.S. Cl.
CPC .. *G01T 1/115* (2013.01); *G01T 1/11* (2013.01)

(58) Field of Classification Search
CPC .................................. G01T 1/115; G01T 1/11
USPC .................................... 250/484.3, 337, 484.2
See application file for complete search history.

(56) References Cited

U.S. PATENT DOCUMENTS

| | | | |
|---|---|---|---|
| 4,636,642 A * | 1/1987 | Simons et al. | 250/337 |
| 4,825,084 A * | 4/1989 | Braunlich et al. | 250/484.3 |
| 4,839,518 A * | 6/1989 | Braunlich et al. | 250/337 |
| 5,043,096 A * | 8/1991 | Lindmayer | 252/301.4 S |
| 5,606,163 A | 2/1997 | Huston et al. | |
| 7,026,616 B1 | 4/2006 | Laing et al. | |
| 2006/0043314 A1 * | 3/2006 | Katzir et al. | 250/484.5 |
| 2011/0031412 A1 * | 2/2011 | Akselrod et al. | 250/459.1 |

FOREIGN PATENT DOCUMENTS

JP    2005-249579 A    9/2005
JP    5059235 B1    10/2012

OTHER PUBLICATIONS

B. Justus, M. Miller, and A. Huston, "Dosimetry Measurement," The Measurement, Instrumentation and Sensors Handbook (1999).
P. Braunlich, J. Gasiot, J.P. Fillard and M. Castagne, "Laser heating of thermoluminescent dielectric layers," Appl. Phys. Lett. 39(9), 769-771 (1981).
J. Gasiot, P. Braunlich, and J.P. Fillard, "Laser heating in thermoluminescence dosimetry," J. Appl. Phys. 53(7), 5200-5209 (1982).
A. Abtahi, P. Braunlich, P. Kelly, and J. Gasiot, "Laser stimulated thermoluminescence," J. Appl. Phys. 58(4), 1626-1639 (1985).

(Continued)

*Primary Examiner* — Yara B Green
(74) *Attorney, Agent, or Firm* — US Naval Research Laboratory; Joslyn Barritt (57) ABSTRACT

An improved thermoluminescence dosimeter (TLD) system, which includes a TLD reader configured to produce data indicative of a radiation exposure, one or more dosimeters comprising a dosimeter substrate coated with a thin layer of a light-absorbing material, a light stimulation source configured to heat the dosimeter using light incident on the dosimeter coating, a light detection system to detect TL emission and an appropriately programmed computer configured to analyze data from the reader and to output data indicative of an extent of radiation exposure.

25 Claims, 6 Drawing Sheets

(56) References Cited

OTHER PUBLICATIONS

A. Abtahi, P. Braunlich, T. Haugan, and P. Kelly, "Investigation of Thermoluminescence Efficiencies at High Laser Heating Rates,"Radiation Protection Dosimetry 17, 313-316 (1986).

P. Kelly, A. Abtahi, and P. Braunlich, "Laser-stimulated thermoluminescence. II," J. Appl. Phys. 61(2), 738-747 (1987).

P. Braunlich, "Present State and Future of TLD Laser Heating," Radiation Protection Dosimetry 34, 345-351 (1990).

J. Lawless and D. Lo, "Thermoluminescence for nonlinear heating profiles with application to laser heated emissions," J. Appl. Phys. 89(11), 6145-6152 (2001).

O. Gayer and A. Katzir, "Laser-fiberoptic non-contact controlled heating of samples for thermoluminescence measurements," Journ. of Lumin. 113, 151-155 (2005).

R. Ditcovski, O. Gayer and A. Katzir, "Laser assisted thermoluminescence dosimetry using temperature controlled linear heating," Journ. of Lumin. 130, 141-144 (2010).

A.E. Rakhshani and F.K. Barakat, "Optical constants of reactively sputtered cupric oxide films," Mater. Lett. 6, 37-40 (2003).

S.W.S McKeever, M. Moscovitch and P.D. Townsend, "Thermoluminescence Dosimetry Materials: Properties and Uses," Nuclear Technology Publishing (1995).

S.M. Pompea and R.P. Breault, "Black Surfaces for Optical Systems," in Handbook of Optics, Devices, Measurements, & Properties, vol. II, Chapter 37, pp. 37.1-37.70, (1995).

B. Justus, T. Johnson, and A. Huston, "Laser-heated Radiation Dosimetry using Transparent Thermoluminescent Glass," Appl. Phys. Lett. 68(1), 1-3 (1996).

A. Abtahi, P. Braunlich, and P. Kelly, "Theory of transient temperature response of a two-layer system heated with a localized laser beam," J. Appl. Phys. 60(10), 3417-3421 (1986).

P. F. Braunlich and W. Tetzlaff, "An Automated Laser Heated Thermoluminescence Dosimetry System," Radiation Protection Dosimetry 17, 321-324 (1986).

D. L. Fehl, D. J. Muron, B. R. Sujka, D. W. Vehar, L. J. Lorence, Jr., R. L. Westfall, S. C. Jones, J. A. Sweet, and P. Braunlich, "Characterizartion of a two-dimensional, thermoluminescent, dose-mapping system: Uniformity, reproducibility, and calibrations," Rev. Sci. Instrum. 65(10), 3243-3251 (1994).

M. Grupen and K. Kearfott, "Numerical analysis of infrared laser heating in thermoluminescent material layers," J. Appl. Phys. 64(3), 1044-1049 (1988).

J.L. Lawless, S.K. Lam, and D. Lo, "Nondestructive in situ thermoluminescence using $CO_2$ laser heating," Optics Express 10(6), 291-296 (2002).

P. Loza, D. Kouznetsov, and R. Ortega, "Temperature distribution in a uniform medium heated by linear absorption of a Gaussian light beam," Appl. Optics 33(18), 3831-3836 (1994).

J. F. Young, P. Kelly, A. Abtahi, P. F. Braunlich, and S. C. Jones "Transient solution of the diffusion equation for a composite system heated with a laser beam," J. Appl. Phys. 66(11), 5627-5629 (1989).

M. E. Grupen-Shemansky, K. J. Kearfott, and E. D. Hirleman, "Numerical analysis of infrared laser heating in thermoluminescent material layers: The focused laser case" J. Appl. Phys. 66(7), 3407-3409 (1988).

Search Report and Written Opinion of International Searching Authority in corresponding PCT Application No. PCT/US2014/011379.

* cited by examiner

(S.W.S McKeever, M. Moscovitch and P.D. Townsend, "Thermoluminescence Dosimetry Materials: Properties and Uses," *Nuclear Technology Publishing* (1995). Figure 3.4.b at page 50)

LASER-HEATED THERMOLUMINESCENCE DOSIMETER

TECHNICAL FIELD

The present invention relates to the measurement of the radiation dose received by a thermoluminescence dosimeter after exposure to ionizing radiation. The dose is determined by measurement of the thermoluminescence emission that results when the dosimeter is heated by exposure to light from a solid state diode laser.

BACKGROUND

Radiation dosimetry involves the quantitative measurement of the physical changes that occur in matter upon exposure to ionizing radiation such as beta and alpha particles, neutral particles such as neutrons, and electromagnetic radiation such as X-rays and gamma rays. It is an important aspect of numerous civilian and military applications, including individual and environmental monitoring, retrospective and accident dosimetry, radiation therapy dosimetry, diagnostic radiology and nuclear medicine dosimetry, and neutron, particle and space dosimetry.

Thermoluminescence dosimetry is one of the most widely used and cost-effective techniques for radiation dosimetry, and has been extensively studied, both experimentally and theoretically.

The radiation-sensitive element of a thermoluminescent dosimeter (TLD) is a small quantity, typically less than 100 mg, of an inorganic crystal doped with metal impurities known in the art as "activators." The activators provide the crystal with the energy storage capacity as well as the luminescent properties that are required for the crystal to function as a thermoluminescent phosphor upon exposure to ionizing radiation. As generally understood, the activators provide point defects, known as traps and luminescence centers, in the crystal lattice of the thermoluminescent phosphor. When the phosphor is exposed to ionizing radiation, electrons and holes are captured in metastable states near the trap centers defined by local potential energy minima until the electrons and holes are sufficiently thermally stimulated to enable them to overcome the potential energy barriers. The thermally stimulated electrons and holes can then recombine at the luminescence centers, emitting photons, referred to as thermoluminescent (TL) emission, as they do so. See B. Justus, M. Miller, and A. Huston, "Dosimetry Measurement," *The Measurement, Instrumentation and Sensors Handbook* (1999), the entirety of which is hereby incorporated by reference into the present disclosure.

Peter Braunlich and others first showed that TL glow curves could be measured by heating thin layers of phosphor powder mixed with a polymer binder and spread on a glass slide. Infrared pulses at 10.6 microns from a carbon dioxide laser were focused onto the powder film and the light was absorbed by both the glass and the polymer binder, heating the phosphor and resulting in TL emission. The TL was characterized by assuming that the thin phosphor layer made no contribution to the thermal properties of the sample (sample=phosphor+binder+glass substrate). See P. Braunlich, J. Gasiot, J. P. Fillard and M. Castagne, "Laser heating of thermoluminescent dielectric layers," *Appl. Phys. Lett.* 39(9), 769-771 (1981); and J. Gasiot, P. Braunlich, and J. P. Fillard, "Laser heating in thermoluminescence dosimetry," *J. Appl. Phys.* 53(7), 5200-5209 (1982).

Later, Braunlich demonstrated that a number of different phosphor configurations could be effectively heated by a continuous wave (cw) $CO_2$ laser with a Gaussian beam profile. For example, Harshaw TLD-100 chips were directly heated by the $CO_2$ laser due to the small absorption of lithium fluoride at 10.6 microns (abs. coef.=40 $cm^{-1}$). See A. Abtahi, P. Braunlich, R. Kelly, and J. Gasiot, "Laser stimulated thermoluminescence," *J. Appl. Phys.* 58(4), 1626-1639 (1985). Since the 1/e attenuation length in the LiF was 250 microns, the light penetrated a significant depth into the 900 micron thick chips.

In one experiment by Braunlich, free-standing polyimide films containing TLD-100 powder were heated with the laser, while in another, thin films of TLD-100 powder in a silicone binder were coated onto glass slides. These films could be heated effectively when the laser light was incident from either the front (powder in binder) side or the back side (glass slide). However, the TL response curves varied significantly depending on the laser power and the details of the sample preparation and Braunlich was unable to accurately model the TL response of any of these samples that were stimulated with a Gaussian beam profile. See A. Abtahi, P. Braunlich, T. Haugan, and P. Kelly, "Investigation of Thermoluminescence Efficiencies at High Laser Heating Rates," *Radiation Protection Dosimetry* 17, 313-316 (1986).

Braunlich next developed a general solution for the TL response of a two-layer TLD system when the dosimeter was stimulated by a uniform circular laser beam, and later showed that laser heating of the dosimeter yields TL glow curves that are similar to those obtained using conventional heating methods. See Abtahi et al. (1986), supra; see also P. Kelly, A. Abtahi, and P. Braunlich, "Laser-stimulated thermoluminescence. II," *J. Appl. Phys.* 61(2), 738-747 (1987). The general solution for the temperature increase in a two-layer system was simplified by assuming that one of the two dosimeter layers was much thinner than the other. When the thermal diffusivity of both layers was assumed to be approximately the same, lateral heat diffusion in the thin layer was ignored and the thermal diffusion in the sample was assumed to be governed only by the properties of the thick layer. Only one limiting case was discussed, i.e., a thick absorbing layer with heat transport across the interface into a thin layer of phosphor. It was assumed that lateral thermal diffusion only occurred in the thick absorbing layer, while no lateral thermal diffusion occurred in the thin phosphor layer. Experiments were performed using 35-40 micron thick layers of phosphor on 150 micron thick glass slides (the absorber). However, Kelly reported that signal reproducibility was a problem due to difficulties encountered in preparing uniform thin films of the phosphor/binder mixture on the glass substrates. See Kelly et al. (1987), supra.

The laser-heated TLD (LHTLD) systems developed by Braunlich and his colleagues required the development of unique TLD badges. The design of the laser-heated TLD dosimeter elements developed by Braunlich was guided by practical consideration of two conflicting requirements: minimum layer thickness and high sensitivity. See P. Braunlich, "Present State and Future of TLD Laser Heating," *Radiation Protection Dosimetry* 34, 345-351 (1990). The LHTLD system developed by Braunlich et al. functioned most effectively when the laser-heated phosphor layer was as thin as possible. However, for adequate sensitivity of the dosimeter to small radiation doses to be maintained, the mass of the phosphor could not be reduced below a minimum (the minimum specific mass in mg/mGy). In other words, the dosimeter elements in the system could not be manufactured as thin as desired because it was necessary to ensure that the sensitivity did not fall below a critical value. In order to satisfy these conflicting requirements, Braunlich developed a unique LHTLD dosimeter consisting of a fine-grain TLD powder and a silicone binder, printed onto metallized polyimide foils. Braunlich also developed dosimeters using all-inorganic elements, because the dosimeters containing polymer and other organic material exhibited spurious TL emissions and light sensitivity problems. See P. Braunlich, "Present State and Future of TLD Laser Heating," *Radiation Protection Dosimetry* 34, 345-351 (1990). Page 347, column 1, paragraph 4.

Others have further examined the use of laser-heated phosphors for radiation detection.

John Lawless and D. Lo studied the laser-heated TL emission properties of phosphors as a function of the temporal profile of the laser heating, and predicted that for a wide range of laser heating profiles (linear, quadratic, or square root with respect to time) the intensity of the peak of the glow curve should follow a general scaling law (peak intensity is inversely proportional to the time at which the peak occurs). See J. Lawless and D. Lo, "Thermoluminescence for nonlinear heating profiles with application to laser heated emissions," *J. Appl. Phys.* 89(11), 6145-6152 (2001). However, he found that the experimental results of Gasiot et al. (1982), supra, do not follow the general scaling law.

Ofer Gayer and Abraham Katzir described a remote laser heating technique in which a silver halide fiber was used to deliver $CO_2$ laser light to a small point on a sample. See 0. Gayer and A. Katzir, "Laser-fiberoptic non-contact controlled heating of samples for thermoluminescence measurements," *Journ. of Lumin.* 113, 151-155 (2005). The TL emitted by the sample was transmitted to a PMT by a standard silica fiber. The temperature of the heated spot was monitored using infrared radiometry. The infrared light was transmitted to an infrared radiometer using a second silver halide fiber. Katzir subsequently reported that the reproducibility observed for the TL measurements could be improved by eliminating the silver halide optical fiber. See R. Ditcovski, O. Gayer and A. Katzir, "Laser assisted thermoluminescence dosimetry using temperature controlled linear heating," *Journ. of Lumin.* 130, 141-144 (2010). Measurements performed on small spots on the samples were problematic due to inhomogeneities in the samples. Katzir found that expansion of the $CO_2$ laser beam, using a ZnSe lens and a mirror, allowed illumination of the entire sample and improved the performance of the LHTLD system. See R. Ditcovski, O. Gayer, and A. Katzir, "Laser assisted thermoluminescence dosimetry using temperature controlled linear heating," *Journ. of Lumin.* 130, 141-144 (2010).

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides an improved laser-heated thermoluminescence dosimeter (LHTLD) system.

An LHTLD system in accordance with the present invention includes an LHTLD reader configured to produce data indicative of a radiation exposure, one or more dosimeters, a light stimulation source configured to heat the dosimeter using light, and a light-detection system that measures the intensity of the TL signal and converts the electrical signal to a binary string that can be processed by an appropriately programmed computer configured to analyze data from the reader and produce data indicative of an extent of radiation exposure.

An LHTLD reader in accordance with the present invention includes a light-tight chamber housing one or more optical filters configured to filter out undesired wavelengths of light, a receptacle configured to receive and hold a dosimeter card containing one or more coated dosimeters, and a photodetector configured to receive photons output from the dosimeter and to output data indicative of the number of photons received. A dosimeter used in the LHTLD system in accordance with the present invention consists of a dosimeter substrate having a thin light-absorbing material layer deposited thereon. In an exemplary embodiment, the dosimeter substrate is a doped lithium fluoride (LiF) TLD chip and the coating is a thin opaque layer of copper oxide having a thickness of less than about 1 µm, though other dosimeter substrates and other coatings, e.g., a coating of graphite having a thickness of about 1 µm, may also be used.

The light stimulation source in an LHTLD system in accordance with the present invention typically is a laser, for example, a solid state diode laser. In an exemplary embodiment, the laser emits light having a wavelength of about 800 nm. The laser light enters the light-tight chamber and is filtered through a red glass filter to remove shorter wavelength amplified spontaneous emissions, emitted by the laser, from the light incident on the dosimeter. The light from the laser (stimulation light) heats the coated TLD chip, causing trapped electrons in the chip to leave their traps and recombine with the metal ions in the chip, resulting in metal ions in an electronically excited state. Some of the excited metal ions can return to their ground states by emitting light in a process known as laser-heated thermoluminescence (LHTL). The LHTL light passes through a blue-green filter into a photomultiplier tube (PMT) assembly. The PMT converts the light into a cascade of electrons that are detected as voltage pulses or electrical currents which are converted to digital data. This digital data can then be processed with an appropriately programmed computer to produce data, e.g., in the form of TL glow curves, indicative of the dosimeter's exposure to radiation.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides an improved laser-heated thermoluminescence dosimeter (LHTLD) system.

In its simplest embodiment, an LHTLD system in accordance with the present invention includes a stimulation light source; a light-tight chamber housing a photodetector, one or more optical filters, and a receptacle for a dosimeter card holding one or more dosimeters having a thin coating of a light-absorbing material on one surface thereof; and a computer or microprocessor for data analysis.

These and other elements of an LHTLD system in accordance with the present invention will be described in more detail below.

Figures 1A, 1B:
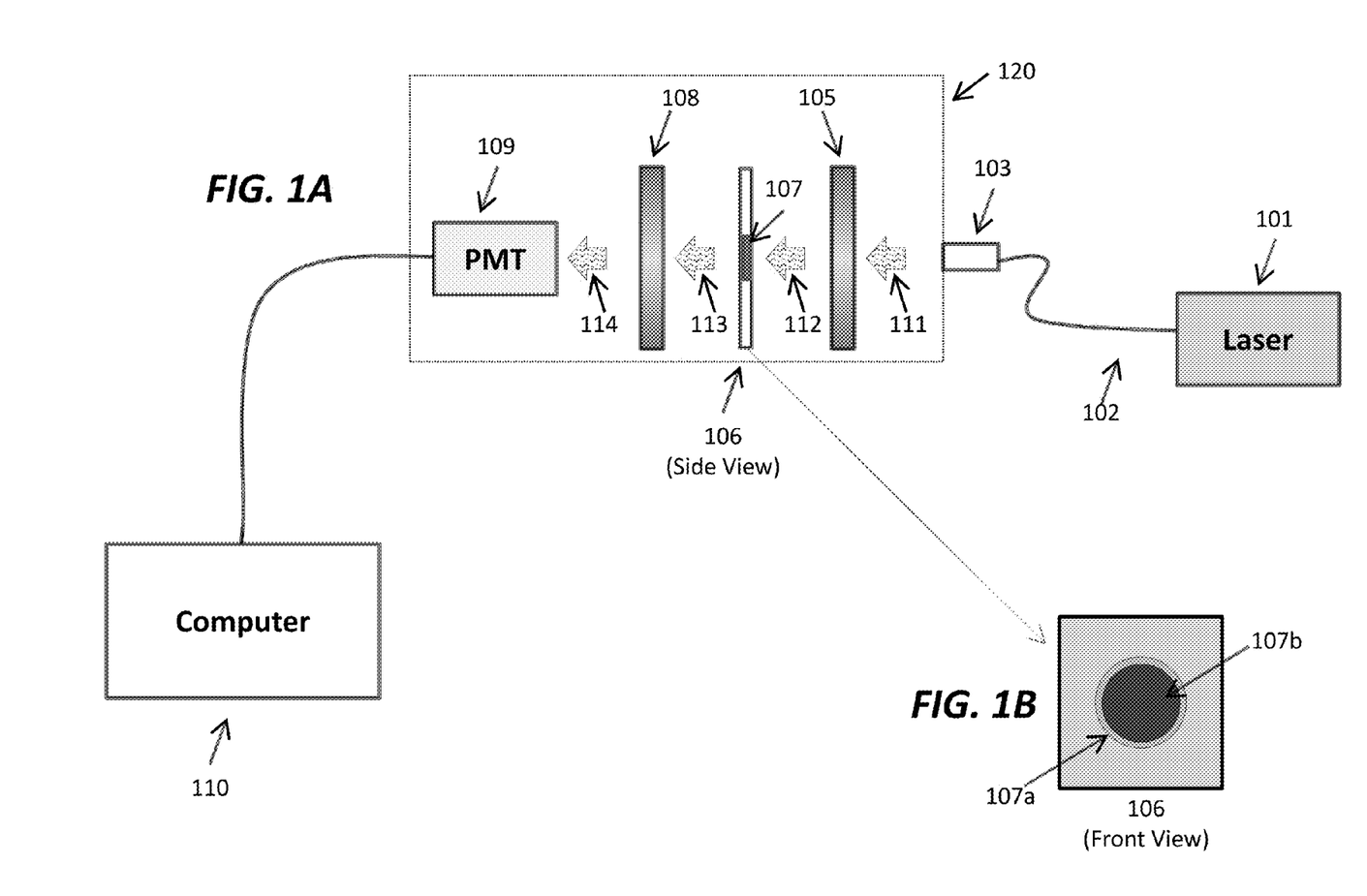
FIGS. 1A and 1B are block diagrams illustrating aspects of an exemplary configuration of an LHTLD system (FIG. 1A) and a coated TLD chip (FIG. 1B) in accordance with the present invention.

FIG. 1A is a simplified block diagram illustrating aspects of an exemplary embodiment of an LHTLD system in accordance with the present invention.

As illustrated in FIG. 1A and as described in more detail below, an LHTLD system in accordance with the present invention includes a stimulation light source in the form of laser 101, an LHTLD reader configured to receive stimulation light from the laser to heat one or more dosimeters 107 held in the reader and to output data indicative of the number of photons emitted from the dosimeter, and an appropriately programmed computer 110 configured to receive data from the LHTLD reader and to output data indicative of the dosimeter's exposure to radiation.

The components of an LHTLD reader in accordance with the present invention include one or more optical filters such as red glass filter 105 and blue-green glass filter 108 and a photodetector such as photomultiplier tube (PMT) 109. These components are situated in a light-tight housing 120, which can be any suitable structure that provides a light-tight path for light to travel from the stimulation light source to the dosimeter and then to the photomultiplier tube. In an exemplary embodiment, light-tight holder 120 can be in the form of an aluminum block having a covered, light-tight slot that can receive a TLD card such as TLD card 106, though other configurations may be used as appropriate.

As illustrated in FIG. 1B and as described in more detail below, dosimeters 107 in accordance with the present invention are in the form of a conventional TLD substrate material 107a, often referred to as a "TLD chip" or "TLD phosphor," having a thin layer of light-absorbing material 107b on one surface thereof. A typical chip may be a lithium fluoride TLD chip such as is available from Thermo Fisher Scientific, though any suitable chip materials, such as thermoluminescent glass, lithium fluoride doped with magnesium and titanium, or other natural or synthetic TLD materials described below, may be used. One or more dosimeters 107 are housed in a dosimeter holder or "dosimeter card" 106 which can be placed into light-tight chamber 120, e.g., via a covered slot in the chamber housing. Dosimeter card 106 is situated in the slot so that the light-absorbing layer 107b of the dosimeter faces laser 101 and is struck by stimulation light from laser 101. To obtain the most efficient heating, dosimeter 107 should be situated so that the coated surface faces the incident laser light, i.e., so that the heating laser light is incident directly on coating 107b and does not travel through TLD substrate material 107a first in order to reach the light-absorbing coating 107b.

In most embodiments, laser 101 will be in the form of a solid state diode laser, though as described below, in other embodiments, other suitable lasers or other sources of stimulation light may be used as appropriate. A wide range of solid state diode lasers that operate at wavelengths throughout the visible and infrared regions are suitable for laser stimulation of the laser-heated dosimeters. In an exemplary embodiment of an LHTLD system demonstrated by the inventors of the present invention and described herein, laser 101 was a solid state diode laser that operated at ~800 nm in continuous wave mode, with typical power levels ranging from 0.1 Watts to 10 Watts, though any suitable light source emitting light at wavelengths anywhere from 550 nm to 1200 nm may be used. As illustrated in FIG. 1A, laser 101 can be fiber pigtailed so that the light it produces is coupled directly into optical fiber 102 and then through a fiber connector into lens 103 which is secured to light-tight housing 120, e.g., by screwing it into the bulkhead of the housing. Lens 103 then focuses the light from laser 101 to produce laser beam 111 in the light-tight housing.

Beam 111 is then directed onto the dosimeter 107. Because the diameter of the beam from laser 101 increases after the beam exits the optical fiber and before it hits dosimeter 107, lens 103 should be configured to focus the light from beam 111 so that the diameter of the beam conforms to the diameter of the coated dosimeter 107. In this way it can be ensured that all of the dosimeter coating 107b is illuminated by the light while minimizing the extraneous laser light entering PMT 109. In an exemplary case demonstrated by the inventors of the present invention, the fiber connector was positioned ~1.5 cm from the dosimeter, thereby allowing the beam to expand to a diameter of ~4 mm at the dosimeter to match the diameter of the chip. In other cases, the beam diameter can be adjusted to accommodate TLD chips having other dimensions. In another exemplary case, the inventors achieve a flat top profile for beam 111. The flat top profile best ensures uniform heating of the dosimeter 107.

Laser beam 111 comprises the laser emission at 800 nm, as well as amplified spontaneous emission at shorter wavelengths. To ensure that the light striking the dosimeter has only the desired wavelength, the LHTLD reader in accordance with the present invention includes a red colored glass filter 105 placed between lens 103 and dosimeter 107 to remove the spurious amplified spontaneous emission having wavelengths shorter than 800 nm from laser beam 111 and produce filtered laser light 112 comprising only the 800 nm laser emission, which strikes dosimeter 107.

As noted above, dosimeter 107 is in the form of a TLD chip 107a having a thin light-absorbing coating 107b on the surface thereof which faces the laser. As filtered laser light 112 strikes the dosimeter, the coating 107b absorbs the laser light. The absorbed light heats TLD chip 107a and generates TL emission 113 which emanates from the uncoated surface of TLD chip 107a opposite laser 101. In addition to TL emission 113, stray 800 nm light that may have been scattered by TLD chip 107a and/or the dosimeter card 106 may be present in the light-tight chamber. To ensure that only TL emission 113 is received and processed by the photodetector, blue-green glass filter 108 is placed between the dosimeter card 106/dosimeter 107 and PMT 109 to absorb the stray 800 nm stimulation light to produce LHTLD signal light 114 which then enters PMT 109.

PMT 109 is a single anode photomultiplier tube module that operates in a photon counting mode. PMT 109 counts the photons of signal light 114 and outputs digital data indicative of the number of thermoluminescent photons emitted by the dosimeter 107. This data can then be input into computer 110 which, using appropriate software, outputs data, e.g., in the form of TL glow curves or the like, indicative of a level of radiation to which dosimeter 107 has been exposed.

In the experiments conducted by the inventors herein, TLD-100H, 600H and 700H chips from Thermo Fisher were used. The chips were 3 mm in diameter and 0.4 mm thick. Several techniques were used to apply a thin, e.g., less than about 1 μm, coating of a light-absorbing material to one face of each TLD chip, including, for example, coating the chips with black spray paint, applying several coats of a suspension of graphite, and deposition of a film of copper oxide. The dimensions described herein are, however, merely exemplary, and TLD chips and coatings having other thicknesses may be used, so long as the thickness of the coating is substantially less than the thickness of the chip.

While all of these coatings provided good heat absorption, the preferred method for coating the chips discovered by the inventors involved the deposition of a thin film of copper oxide. To accomplish this, the TLD chips were coated on one side with 500 nm of copper (greater than 99.999% purity) using a vacuum-based magnetron sputter deposition apparatus. The copper sputtering was performed in a custom-built stainless steel bell jar vacuum system outfitted with an oil-free roughing pump and a cryopump high vacuum source (base pressure $10^{-8}$ torr). The TLD chips were placed in a sample holder on the vacuum chamber floor at a 14 cm working distance from a downward facing Cu sputter source (MightyMAK®). The copper was deposited using 50 Watts of power in an argon flow (20 sccm, 7.4 mTorr backing pressure). The film thickness was estimated from a standard calibration curve based on previously characterized samples deposited using similar sputter powers. The copper deposition rate was 11 nm/min.

Figure 2A:
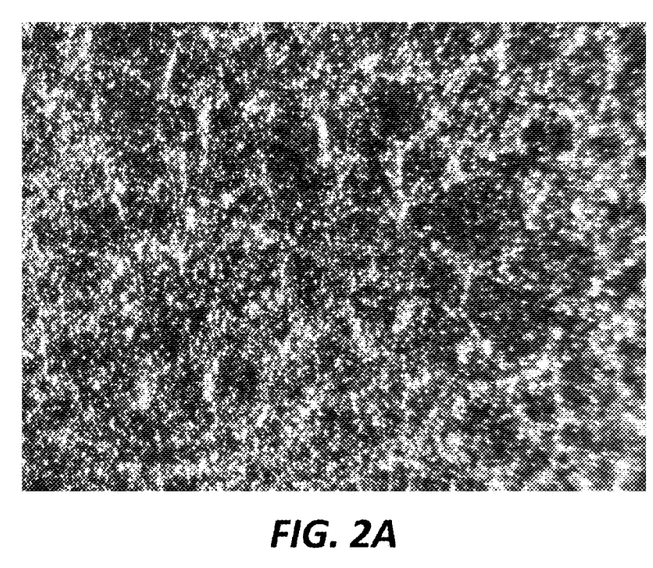
FIGS. 2A and 2B are optical micrographs depicting aspects of an exemplary thin opaque film deposited on a LiF TLD chip in accordance with the present invention, with FIG. 2A depicting the surface of a 500 nm thick copper film deposited on the chip before oxidation and FIG. 2B depicting the surface of the copper oxide film obtained after oxidation of the film depicted in FIG. 2A.
Figure 2B:
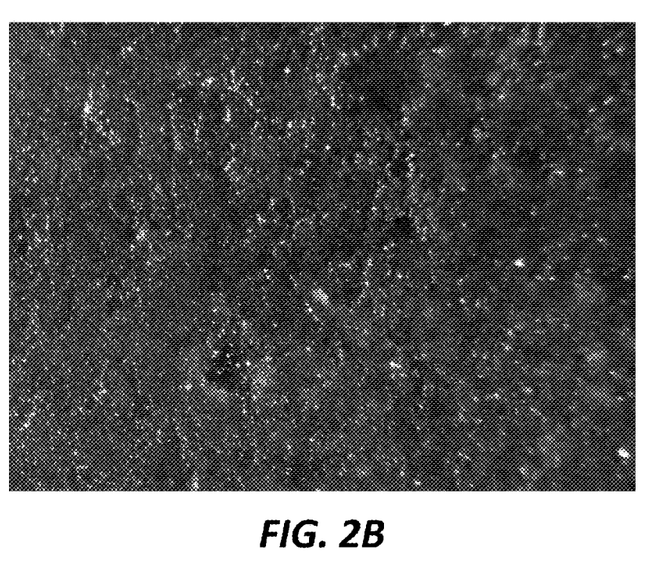

FIGS. 2A and 2B are optical micrographs illustrating these aspects of the coated TLD chips in accordance with the present invention. FIG. 2A is an optical micrograph of the copper-coated LiF surface. The copper-coated TLD chips were placed in an oven and heated in air at 230 C for 48 hours. The oxidizing environment caused the complete oxidation of the copper film, yielding a 500 nm thick film of copper oxide, as shown in FIG. 2B. The absorption coefficients of rf sputtered copper oxide films have been previously shown to be greater than $10^4$ cm$^{-1}$ (see A. E. Rakhshani and F. K. Barakat, "Optical constants of reactively sputtered cupric oxide films," *Mater. Lett.* 6, 37-40 (2003)) and the absorption of the film is estimated to be greater than 0.5.

Thus, in accordance with the present invention, a TLD chip coated with a thin light-absorbing film can be heated by a simple diode laser to provide data indicative of a radiation exposure by the chip.

Example

In an experimental case examined by the inventors, a solid state diode laser operating in cw mode at 800 nm provided heating light to TLD chips coated with a thin graphite film facing the laser. The minimum power required to effectively read the TLD chip was ~0.5 W, with higher power laser operation reducing the time needed to completely readout the TL signal. The TL emission from the laser heated TLD chips was filtered using a blue-green colored glass filter that absorbed stray 800 nm stimulation light. The TL signal was detected by a photon counting module and the data was analyzed by a computer using a custom LabView program.

The results are shown in the plots in FIG. 3A and FIGS. 4-6. While previous laser-heated TLD systems have produced complex glow curves that are markedly different from those produced by conventional heating, See Kelly et al. (1987), supra ("These luminescence responses . . . are not the familiar TL glow curves, but rather exhibit a complex shape with limited glow peak separation, which is the result of the non-uniform laser beam profile and the resulting nonuniform temperature distribution in the sample."), as would be understood by one skilled in the art, the plots in FIG. 3A and FIGS. 4-6 demonstrate that the results obtained using an LHTLD system in accordance with the present invention are comparable to those obtained by TLD systems using conventional heating methods such as gas heating. For example, compare FIG. 6 to the exemplary conventional glow curve shown in FIG. 3B. See S. W. S McKeever, M. Moscovitch and P. D. Townsend, "Thermoluminescence Dosimetry Materials: Properties and Uses," *Nuclear Technology Publishing* (1995), Figure. 3.4.b at page 50.

Figure 3A:
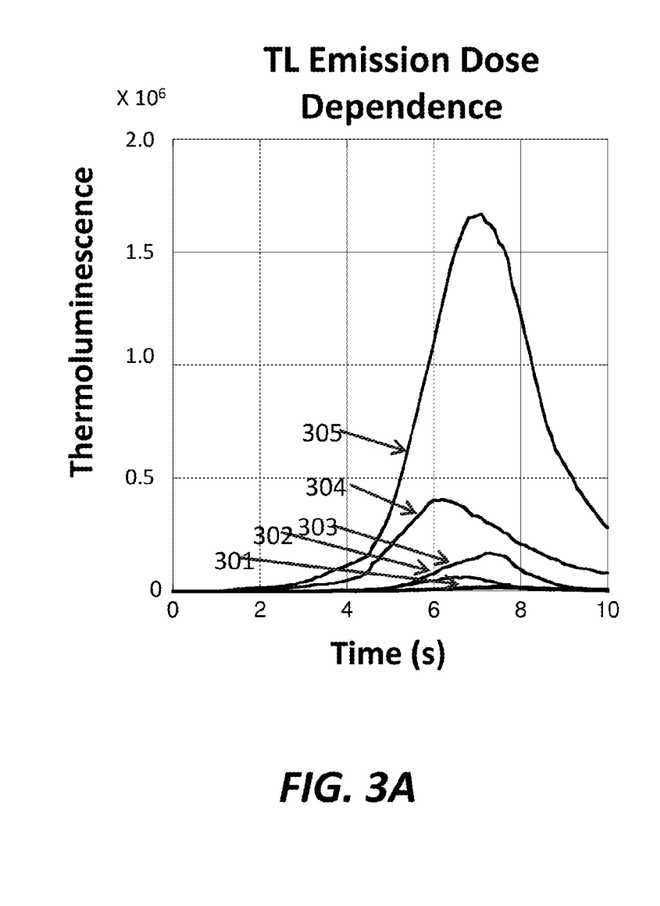
FIGS. 3A and 3B are plots showing thermoluminescence glow curves, with FIG. 3A showing laser-heated thermoluminescence glow curves of graphite-coated TLD-100 chips in a TLD system in accordance with the present invention and FIG. 3B showing glow curves produced in accordance with the prior art.
Figure 3B:
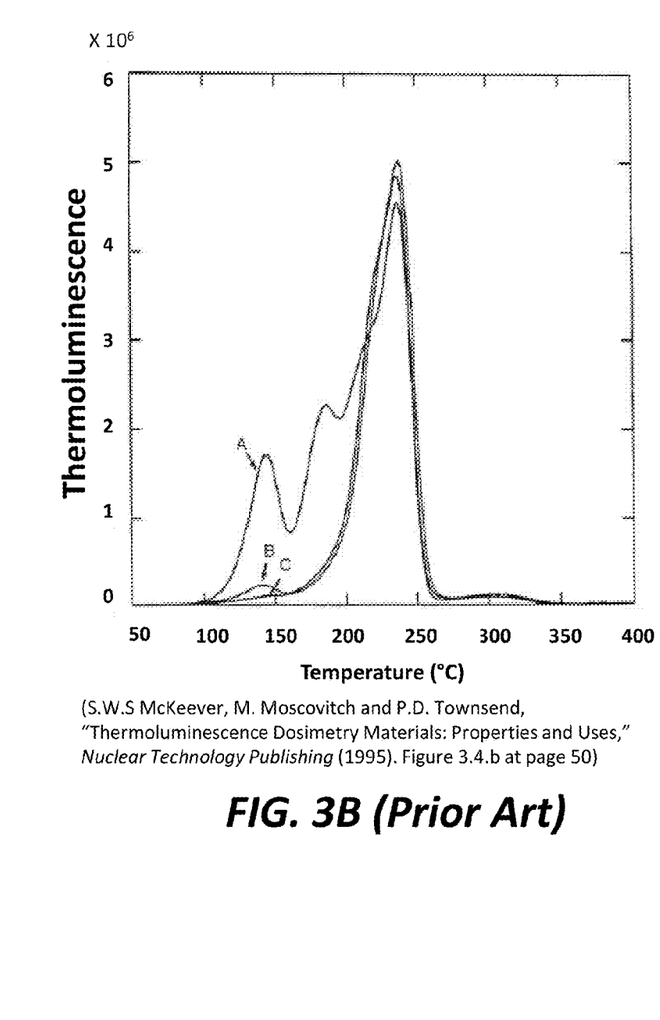

FIG. 3A contains laser-heated thermoluminescence glow curves of graphite-coated TLD-100 chips as a function of radiation dose. The laser current was 1.5 A for each readout, corresponding to a laser power of ~0.75 Watts. As shown in FIG. 3A, the number of photons emitted by the chips greatly increased with the level of radiation, with plot 301, showing a very low level of TL emission, being for an exposure to a 20 mrem radiation dose, plot 302 being for a 50 mrem radiation dose, plot 303 being for a 200 mrem dose, and plot 304 being for a 500 mrem dose. Finally, plot 305, for an exposure to 2000 mrem of radiation, shows the highest level of TL emission, with over $1.5 \times 10^6$ photons being detected by the photodetector at the peak. As noted above, the plots in FIG. 3A are comparable to those that may be obtained using conventional heating methods.

Figure 4:
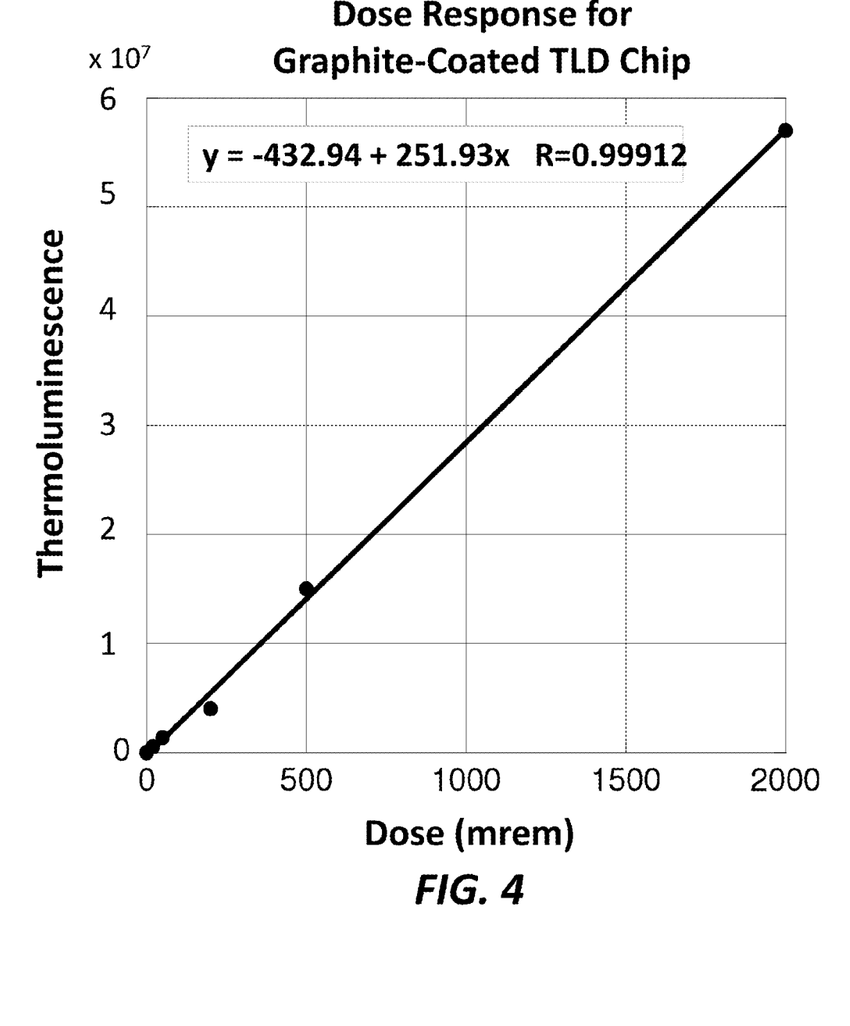
FIG. 4 is a plot showing the dose response curve of a laser-heated, graphite coated TLD-100 chip in accordance with the present invention.

A dose response curve for the graphite-coated TLD chips of FIG. 3A is shown in FIG. 4. The data was obtained by integrating the area under the glow curves in FIG. 3A. As can be seen from the plot in FIG. 4, the dose response is linear (R=0.999) from 20 mrem to 2000 mrem, the range of doses of greatest interest in personal dosimetry applications.

Figure 5:
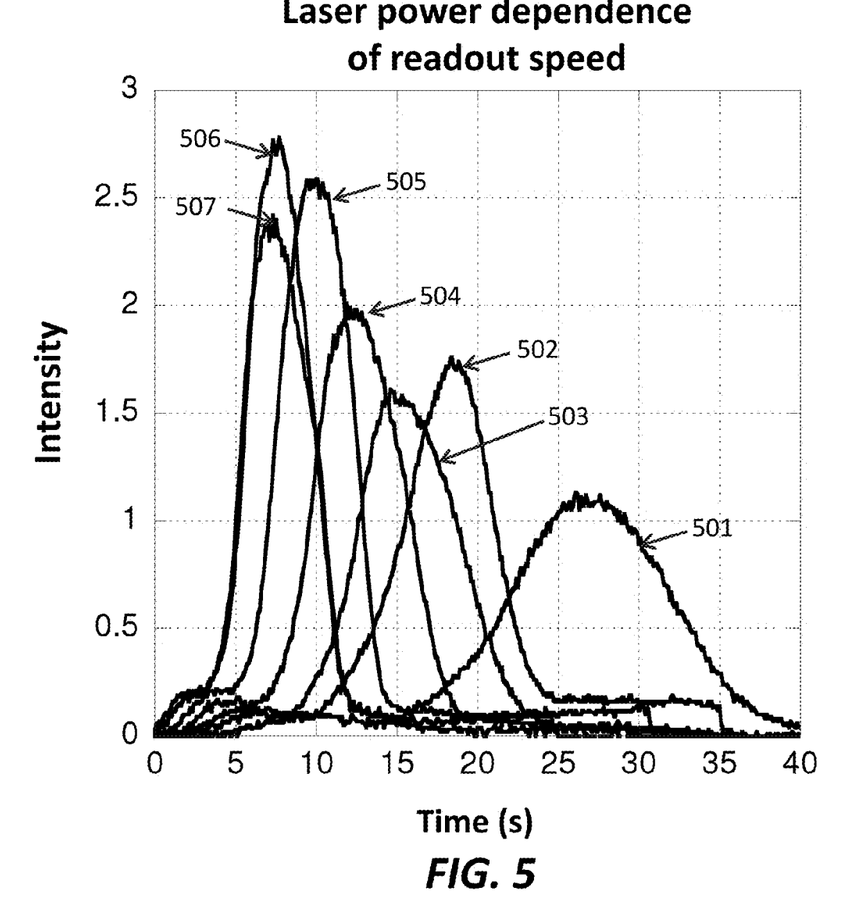
FIG. 5 is a plot showing laser-heated thermoluminescence glow curves of graphite-coated TLD-100 chips in accordance with the present invention as a function of the power of the heating laser.

Laser-heated thermoluminescence glow curves for TLD-100 chips coated with a thin layer of graphite in accordance with the present invention are shown in FIG. 5. The laser power ranged from about 3 Watts to 6 Watts, with plots 501, 502, 503, 504, 505, 506, and 507 illustrating the glow curves produced using a laser power of 3 Watts, 3.5 Watts, 4 Watts, 4.5 Watts, 5 Watts, 5.5 Watts, and 6 Watts, respectively.

As can be seen from plots 501-507, the thermoluminescent emissions from the TLD chip are largely dependent on the laser power used, with a lower power laser light producing a luminescence signal that is broad and has a smaller peak signal than the luminescence signal obtained at higher power that is narrow and has a larger peak signal. Thus, so long as the light-absorbing coating on the TLD chip behaves the same way for all laser powers (i.e., it does not ablate or pit under high laser power, nor does it delaminate from the substrate), the laser used can be tailored for specific applications. For example, in cases where a large number of TLD badges need to be read, a higher power laser may be used since such a laser would provide readout results in a shorter period of time. On the other hand, the present invention enables the development of a small, portable, battery operated reader that can operate in the field, using lasers operating at much lower power.

Figure 6:
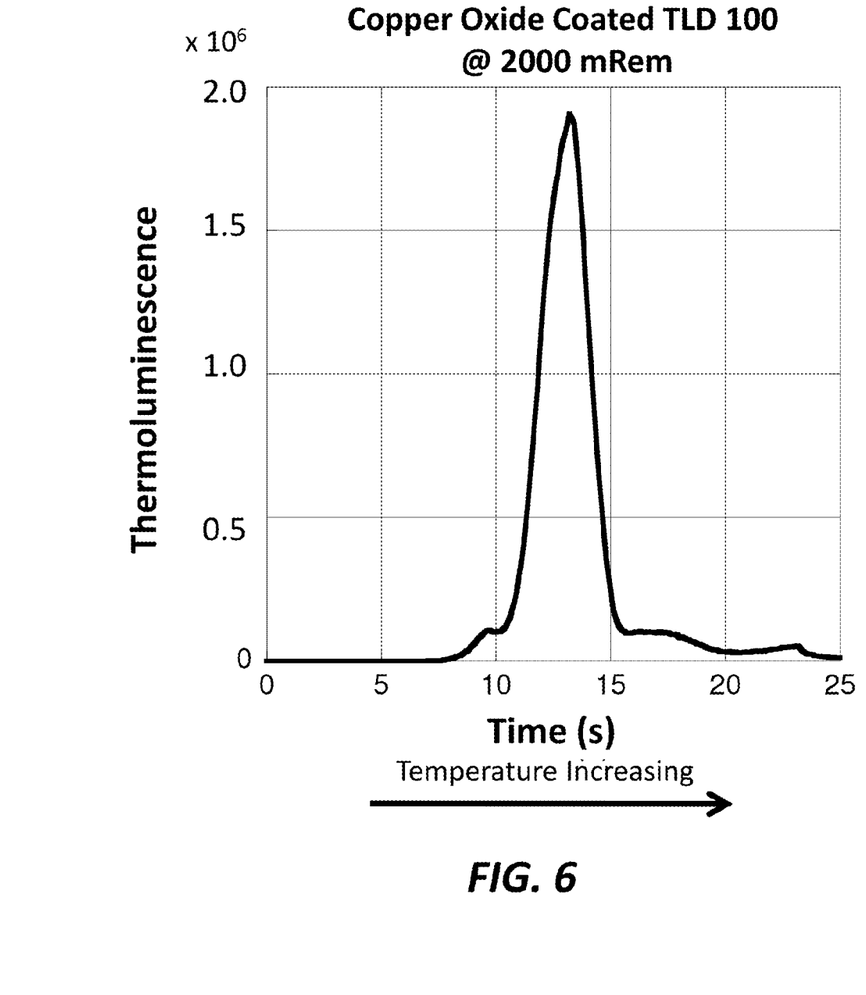
FIG. 6 is a plot showing a laser-heated thermoluminescence glow curve of an exemplary copper oxide-coated TLD-100 chip in accordance with the present invention.

FIG. 6 is a thermoluminescence glow curve for a laser-heated copper oxide-coated TLD chip in accordance with the present invention. As can be seen from the plot in FIG. 6, such a chip provides results similar to those obtained by the graphite-coated TLD chips as illustrated in FIGS. 3A and 4. Thus, as noted above, any suitable material can be used for the thin, light-absorbing coating on the TLD chip in accordance with the present invention so long as the material absorbs the light well, does not interact with the TLD chip material, and is not damaged under laser heating.

Advantages

The LHTLD system in accordance with the present invention possesses a number of advantages over the current LHTLD art. These advantages include but are not limited to the following:

The LHTLD system in accordance with the present invention is compatible with existing state-of-the-art TLD badge and reader technology. In contrast to the Braunlich LHTLD technology described above, which required the development of special, thin-layer laser-heatable dosimeters that were unique to the Braunlich LHTLD system, the LHTLD system in accordance with the present invention can be readily adapted for use with existing TLD readers and badges. Specifically, a thin, absorbing coating can readily be applied to standard TLD chips, such as TLD-100, and so does not require the design and manufacture of specialized dosimeters or dosimeter chips. The TL glow curve of the coated dosimeter chips in accordance with the present invention can be accurately read using any appropriate LHTLD reader and the resulting glow curve will be essentially identical to that obtained using conventional heating methods. The exact same coated TLD chips can also be mounted in standard TLD cards and read without any adverse effect in a conventionally heated TLD reader. This feature significantly enhances the versatility of the LHTLD technology taught in this disclosure and distinguishes it from previous LHTLD embodiments.

Solid State Diode Laser Heating.

All prior art LHTLD systems have used carbon dioxide gas lasers as the heating source. Carbon dioxide lasers are large, bulky lasers with significant stability problems. Temporal instability of the $CO_2$ laser was previously reported to be the primary cause of data scatter. See Gasiot et al. (1982), supra. Braunlich et al. reported use of an rf-excited, non-waveguide cw laser that offered improvements in size, simplicity and ruggedness compared to the previous, water cooled $CO_2$ lasers that were used. See Braunlich et al. (1990), supra. This $CO_2$ laser also suffered from problems, such as a non-uniform beam profile and extreme sensitivity to temperature variations. The temperature variation in turn caused changes in the output power, polarization and wavelength. Since the temperature variations could not be controlled without elaborate temperature stabilization measures, the power and polarization instabilities were addressed using special laser beam control and shaping optics. A dedicated feedback circuit, controlled by a microprocessor, provided for laser beam power control. None of these problems are an issue for solid state diode laser stimulation. Solid state diode lasers are simple, reliable, compact, and rugged.

High Volume Fabrication of Coated Chip.

Rf sputtering of copper, followed by oxidation to yield copper oxide, the method taught for depositing opaque light absorbing coatings on the TLD chips, is capable of simultaneously coating large numbers of TLD chips.

High Chip to Chip Reproducibility.

The deposition rate of the rf-sputtered copper is 11 nm/minute, allowing the thickness of the films to be controlled with nm precision. The chip to chip variations are essentially negligible. In contrast, large dosimeter to dosimeter variations were observed for the thin layer, laser heated dosimeter elements developed by Braunlich and his colleagues. See Kelly et al. (1987), supra.

Alternatives

Light stimulation source. In the exemplary implementation examined by the invention and described herein, the LHTLD system in accordance with the present invention included a solid state diode laser operating at ~800 nm. Diode lasers operating at other visible and near-infrared wavelengths can also serve as effective heating sources. In addition, some light emitting diodes can function as heating sources. However, any suitable light stimulation source can be used in an LHTLD system in accordance with the present invention, including a broadband light source, such as a tungsten lamp or a halogen lamp, and a light emitting diode.

Filters.

The LHTLD system in accordance with the present invention can include any suitable optical filter, including colored glass filters made from colored glass and interference filters.

Chip Materials.

The LHTLD system in accordance with the present invention can be used with TLD chips made from any appropriate TLD materials. For example, there are many high-sensitivity synthetic TLD materials that may be suitable for use, such as fluorides (lithium fluoride, calcium fluoride); oxides (aluminum oxide, beryllium oxide and magnesium oxide); sulphates (calcium sulphate); and borates (lithium borate and magnesium borate). In addition, there are natural dosimeter materials, such as a fused quartz material, that can be used, and use of all suitable TLD materials is contemplated to be within the scope of the present invention.

Light Absorbing Coating Materials.

The LHTLD system in accordance with the present invention was demonstrated by the inventors using thin absorbing films such as black spray paint, graphite, and copper oxide coated onto the surface of the TLD chips. In addition to those described above, many other opaque absorbing materials such as specialized optical paints and painted multilayer coatings (Chemglaze®, Aeroglaze®, LMSC Black, etc.), anodized, etched, or electrodeposited surfaces (Orlando Black Optical Coating), or black plastics (Delrin®, Polyethylene Black, Tedlar® Black, Velestat Black) may be suitable for use as a thin absorbing film for an LHTLD dosimeter in accordance with the present invention. See S. M. Pompea and R. P. Breault, "Black Surfaces for Optical Systems," in *Handbook of Optics, Devices, Measurements, & Properties*, Volume II, Chapter 37, pages 37.1-37.70, (1995), the entirety of which is incorporated by reference into the present disclosure.

Methods for Depositing Opaque Films.

In addition, although only copper oxide formation on the TLD chip was described, any deposition method capable of depositing a thin film of opaque material onto a TLD phosphor can be used, so long as the method allows deposition of the materials onto the chosen TLD phosphor without significantly affecting the TLD properties of the phosphor. For example, copper oxide films may be deposited using a dc reactive magnetron sputtering technique in addition to the method taught above.

Incorporation of Light Absorbing Materials into the TLD Phosphor.

The demonstration of bulk laser heating of TLD-100 chips due to the small absorption (abs. coef.=40 cm−1) of lithium fluoride was previously discussed above. See discussion of Abtahi et al. (1985), supra. Bulk laser heating can be enhanced by the incorporation of absorbing organic or inorganic materials into the TLD phosphors. LHTLD using an absorbing rare earth ion incorporated into a transparent thermoluminescent glass has been previously demonstrated. See B. Justus, T. Johnson, and A. Huston, "Laser-heated Radiation Dosimetry using Transparent Thermoluminescent Glass," *Appl. Phys. Lett.* 68(1), 1-3 (1996), the entirety of which incorporated by reference into the present disclosure. A highly absorbing organic material, such as phthalocyanine, would also be well-suited for LHTLD applications. However, it should be noted that the dopant material, whether it is organic or inorganic, must satisfy several fundamental requirements: (1) The dopant should absorb light at a wavelength that is well-removed from the wavelength of the TL emission; and (2) the dopant does not significantly alter the TL properties of the phosphor; and (3) the dopant does not decompose rapidly at the elevated temperatures used in the LHTLD readout.

Thus, the present invention provides an improved system for laser heated thermoluminescence dosimetry (LHTLD). The LHTLD system in accordance with the present invention can provide rapid, accurate measurement of radiation doses over a wide dynamic range of doses. The LHTLD system in accordance with the present invention is compact and low cost, and can function as a replacement system for existing conventional TLD readers to provide improved read-out speed and higher throughput. In addition, the LHTLD system of the present invention does not require the development of completely new TLD materials; with appropriate modifications the LHTLD system can be compatible with existing industry-standard TLD materials, such as TLD-100, and existing TLD reader devices.

It should be noted that although particular embodiments, aspects, and features have been described and illustrated, one skilled in the art would readily appreciate that the invention described herein is not limited to only those embodiments, aspects, and features but also contemplates any and all modifications within the spirit and scope of the underlying invention described and claimed herein, and such combinations and embodiments are within the scope of the present disclosure.

What is claimed is:

1. A thermoluminescent dosimeter (TLD) system, comprising:
    a thermoluminescent dosimeter comprising a thermoluminescent substrate having a thin layer of light-absorbing material disposed on one surface thereof, a thickness of the thermoluminescent substrate being much greater than a thickness of the light-absorbing material;
    a stimulation light source configured to provide light having a wavelength of between 550 nm and 1200 nm to the thermoluminescent dosimeter; and
    a TLD reader, the TLD reader comprising:
        a light-tight dosimeter holder configured to hold the thermoluminescent dosimeter, the thermoluminescent dosimeter being situated in the dosimeter holder with the layer of light-absorbing material facing the light source so that light from the light source strikes the light-absorbing material without first traveling through the dosimeter substrate;
        at least one first optical filter configured to remove spurious wavelengths from light provided by the stimulation light source to produce a filtered stimulation light having a first desired wavelength;
        at least one second optical filter configured to remove spurious wavelengths from a thermoluminescent (TL) emission from the thermoluminescent dosimeter to produce a filtered TL emission having a second desired wavelength, the filtered TL emission being indicative of an exposure of the dosimeter to radiation; and
        a photodetector configured to receive the filtered TL emission from the dosimeter and to output photon data indicative of a number of photons produced by the TL emission;
    wherein light from the stimulation light source enters the TLD reader and is filtered by the first optical filter to form the filtered stimulation light, the filtered stimulation light striking the light-absorbing material on the thermoluminescent substrate without first traveling through the thermoluminescent substrate;
    wherein the light-absorbing material becomes heated from an absorption of the filtered stimulation light;
    wherein the thermoluminescent substrate becomes heated from an absorption of light by the light-absorbing material; and
    wherein the thus-heated thermoluminescent substrate produces the TL emission.

2. The TLD system according to claim 1, wherein the stimulation light source emits light at a wavelength of about 800 nm.

3. The TLD system according to claim 1, wherein the stimulation light source is a solid state diode laser having a power of about 0.1 to about 10 Watts.

4. The TLD system according to claim 1, wherein the stimulation light source is a light emitting diode.

5. The TLD system according to claim 1, wherein the stimulation light source is a filtered broadband light source.

6. The TLD system according to claim 5, wherein the stimulation light source is a tungsten lamp.

7. The TLD system according to claim 5, wherein the stimulation light source is a halogen lamp.

8. The TLD system according to claim 1, wherein the thermoluminescent substrate is a phosphor.

9. The TLD system according to claim 1, wherein the thermoluminescent substrate is a synthetic TLD material based on metal-ion-doped and co-doped lithium fluoride.

10. The TLD system according to claim 1, wherein the thermoluminescent substrate is lithium fluoride doped with magnesium and titanium.

11. The TLD system according to claim 1, wherein the thermoluminescent substrate is a synthetic TLD material based on metal-ion-doped and co-doped lithium borate.

12. The TLD system according to claim 1, wherein the thermoluminescent substrate is lithium borate doped with manganese.

13. The TLD system according to claim 1, wherein the thermoluminescent substrate comprises one of a fluoride material, an oxide material, a sulfate material, and a borate material.

14. The TLD system according to claim 1, wherein the thermoluminescent substrate comprises a doped fused quartz material.

15. The TLD system according to claim 1, wherein the thermoluminescent substrate is a thermoluminescent glass.

16. The TLD system according to claim 1, wherein the thin layer of light-absorbing material on the thermoluminescent substrate is a layer of copper oxide having a thickness of about 500 nm.

17. The TLD system according to claim 1, wherein the thin layer of light-absorbing material on the thermoluminescent substrate is a layer of graphite having a thickness of about 1 μm.

18. The TLD system according to claim 1, wherein the light-absorbing material comprises an optical paint on the surface of the thermoluminescent substrate.

19. The TLD system according to claim 1, wherein the light-absorbing material comprises one of an anodized, an etched, and an electrodeposited material on the surface of the thermoluminescent substrate.

20. The TLD system according to claim 1, wherein the light-absorbing material comprises an opaque plastic material on the surface of the thermoluminescent substrate.

21. The TLD system according to claim 1, wherein at least one of the first and second optical filters is an optical glass filter.

22. The TLD system according to claim 1, wherein at least one of the first and second optical filters is an interference filter.

23. The TLD system according to claim 1, further comprising a computer programmed with appropriate software configured to receive and analyze the photon data from the photodetector and to output data indicative of an exposure by the dosimeter to ionizing radiation.

24. A thermoluminescent dosimeter comprising a thermoluminescent substrate coated with a thin layer of light-absorbing material, wherein the dosimeter is configured to absorb light from a stimulation light source having a power of 0.1 Watt to 10 Watts such that the coating is heated by the absorbed light which in turn heats the thermoluminescent substrate to produce thermoluminescent emission from the dosimeter, the thermoluminescent emission being indicative of an exposure by the dosimeter to ionizing radiation.

25. The thermoluminescent dosimeter according to claim 24, wherein the dosimeter is configured to produce thermoluminescent emission by absorbing light having a wavelength between 550 nm and 1200 nm from the stimulation light source.

* * * * *